July 13, 1926.
W. H. TURNER
1,592,166
REAMER EXPANDING PILOT
Filed April 21, 1924
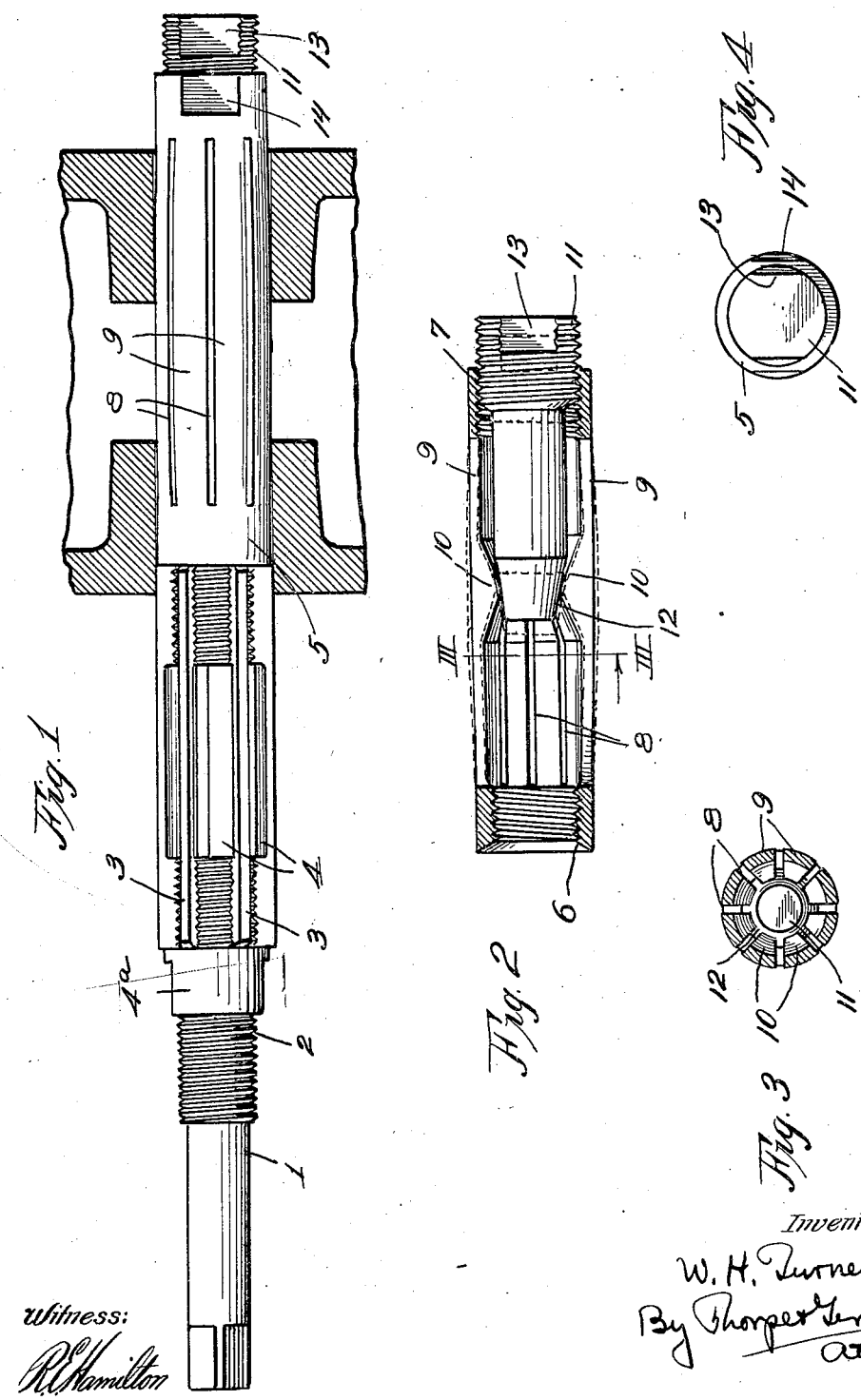

Patented July 13, 1926.

1,592,166

UNITED STATES PATENT OFFICE.

WARREN H. TURNER, OF KANSAS CITY, MISSOURI, ASSIGNOR TO THE TURNER REAMER AND MANUFACTURING COMPANY, OF KANSAS CITY, MISSOURI, A CORPORATION OF MISSOURI.

REAMER EXPANDING PILOT.

Application filed April 21, 1924. Serial No. 707,930.

This invention relates to expanding pilots for use in centering reamers and is designed more especially for use where it is desired to ream out two axially alined spaced holes, for example, the wrist pin holes in a piston head.

Heretofore, with centering guide located at the extreme end of the holes, it has been difficult to properly aline the reamer when commencing the reaming operation as the bit is free for more or less chattering.

The object of the invention, therefore, is to provide an expanding pilot which may be used in holes of varying diameter within certain limits and which will offer a firm and unyielding guide closely adjacent to the cutting elements of the reamer in all stages of the reaming operation, thus effectually guarding against chattering and insuring holes of uniform diameter from end to end.

Another object is to produce a pilot of the character mentioned which is adapted for use with the common and ordinary type of reamer now on the market and called the "Critchley" reamer, and which is of strong, durable, efficient and inexpensive construction.

With the objects named in view, the invention consists in certain novel and useful features of construction and organization of parts as hereinafter described and claimed; and in order that it may be fully understood, reference is to be had to the accompanying drawing, in which:—

Figure 1 is a side elevation of a tool embodying the invention and illustrates in section a piston head in the process of being reamed.

Figure 2 is a central longitudinal section through the expanding pilot constituting the invention.

Figure 3 is a section on the line III—III of Figure 2.

Figure 4 is an end view of the pilot.

In the said drawing, where like reference characters identify corresponding parts in all of the figures, 1 illustrates the shank of the ordinary type of reamer used in reaming out wrist pin holes in piston heads, the body being threaded as at 2. Mounted in the threaded portion of the reamer are the cutting or scraping bits 3 spaced apart by the rib members 4 of the threaded body. The reamer which is of the well-known Critchley type is complete except that one of the nuts 4ª whereby the cutters are longitudinally adjusted and held, is omitted.

A tubular expansible pilot 5 having internal threads 6 and 7 at its opposite ends, is attached to the end of the reamer 2 by engaging it at the threaded end 6, and is screwed home to maintain the bits in position and performs the function of the omitted nut 4ª. Between the threaded ends 6 and 7, the pilot 5 is formed with a series of equi-spaced slits 8, dividing the body of the pilot into a series of sections 9 which may be expanded, as will hereinafter appear.

Each of the sections 9 is formed internally and at a point substantially midway its length, with a substantially V-shaped lug 10. In order to apply pressure against the lugs 10 to expand the sections 9, an expanding pin 11 has threaded engagement with the end 7 and is formed at its extremity with a tapered portion 12 adapted to engage the faces of the lugs 10, and upon the inward movement of said pin, will apply outward force against the lugs and bring about the expansion of the sections 9 equally in all directions to properly fit in the holes to be reamed.

In order that the expansion pin 11 may be conveniently screwed into position, its extremity is formed with a suitable socket 13; and in order to attach and detach the pilot from the end of the reamer, the end of said pilot is flattened slightly as at 14 on its opposite sides for convenience in gripping same with a wrench or the like.

In the operation of the device, the pilot is first slipped into the hole to be reamed and then is expanded by means of the pin 11 until it snugly engages the hole, it being noted in this connection that the external diameter of the expanded portion of the pilot is the same for substantially the length of the lugs and coincidental therewith, and then that it gradually tapers downward in opposite directions from said central portion. By reference to Figure 1, it will be seen, due to the fact the pilot is of substantially the same diameter coincidental with the lugs, that it will properly center itself in both wrist pin holes and bridge the space between them after the reamer has commenced to act on the first hole, thus offering a firm bearing for the reamer and hold the same against chattering.

The pilot will maintain engagement with the wrist pin holes until the reamer has stabilized itself in the second hole to such extent that it will be impossible for it to have any play and hence will engage and ream the second hole in perfect alinement with the first one.

With a reamer of this type, it will be possible by first fitting it in the holes and then removing it, to obtain exact measurements of the holes by placing a micrometer on the pilot, something which cannot be accomplished with any pilot as far as known, for use with the Critchley type of reamer.

From the above description it will be apparent that I have produced a device of the character described which possesses all of the features of advantage set forth as desirable, and while I have described and claimed the preferred embodiment of the same, I reserve the right to make all changes properly falling within the spirit and scope of the appended claims.

I claim:

1. An expanding pilot comprising a tubular longitudinally-slotted member having solid ends and threaded at one of its ends and provided with internal lugs, said member being formed at its other end with internal threads adapted for engagement with a reamer, and means for applying force radially outward on said lugs and having threaded engagement with the first-named threads of said member.

2. An expanding pilot comprising a tubular longitudinally-slotted member having solid ends and threaded at one of its ends and provided with internal lugs, said member being formed at its other end with internal threads adapted for engagement with a reamer to clamp the cutting blades thereof in position, and means engaging the first-named threaded end for applying force radially outward on said lugs to effect the expansion of the pilot.

3. The combination with a reamer having longitudinally adjustable bits and a threaded end, of a resilient tubular pilot threaded at its opposite ends and engaged at one end with the threaded end of said reamer and at such end abutting and maintaining said bits in position, the slots of the pilot terminating short of the ends thereof, and means for expanding the pilot intermediate its ends.

In witness whereof I hereunto affix my signature.

WARREN H. TURNER.